July 15, 1941.  M. R. HANNA  2,249,472

SPLIT BEARING

Filed Dec. 19, 1939

Inventor:
Max R. Hanna,
by Harry E. Dunham
His Attorney.

Patented July 15, 1941

2,249,472

UNITED STATES PATENT OFFICE 2,249,472

SPLIT BEARING

Max R. Hanna, Erie, Pa., assignor to General Electric Company, a corporation of New York Application December 19, 1939, Serial No. 310,026

4 Claims. (Cl. 308—132)

My invention relates to journal bearings and has particular application in railway construction.

Heretofore journal bearings have been constructed with the bearing lining and the supporting sleeve each split in substantially the same plane.

An object of my invention is to provide a bearing of the above mentioned split type, wherein the split in the bearing lining is arranged at the point of minimum bearing pressure which will usually be substantially at right angles to the plane of division of the supporting sleeve member.

Another object of my invention is to provide a window in the bearing lining through which a lubricant may be conducted and to arrange the window substantially at the point of minimum bearing pressure.

A further object of my invention is to provide a convenient means for expanding the bearing lining into close contact with its supporting sleeve member in a simple and efficient manner.

Further objects and advantages of my invention will become apparent from the following description referring to the accompanying drawing, and the features of novelty which characterize my invention will be pointed out with particularity in the claims annexed to and forming a part of this specification.

Figure 1:
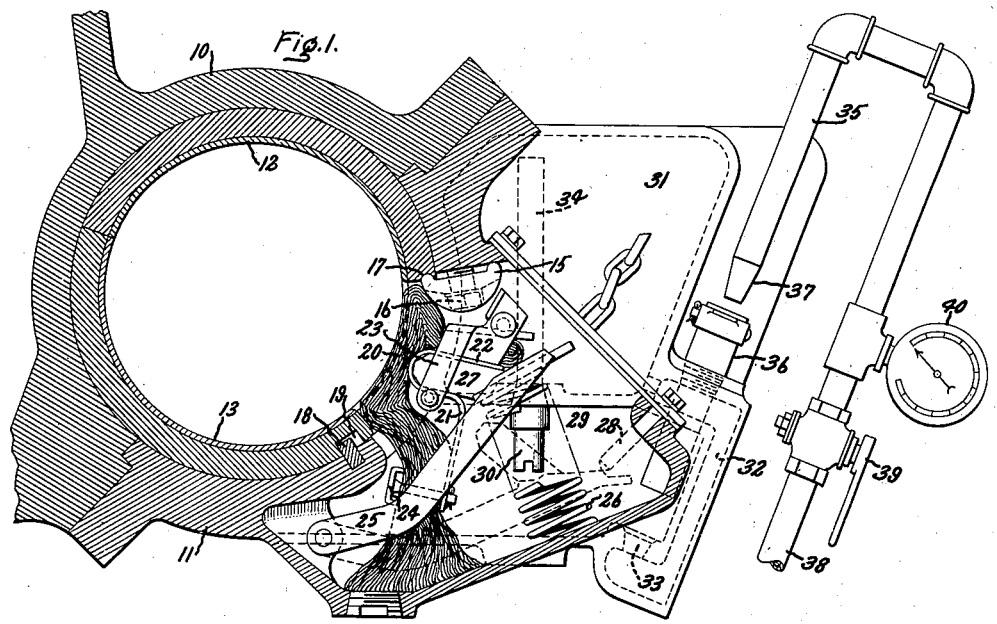
Figure 2:
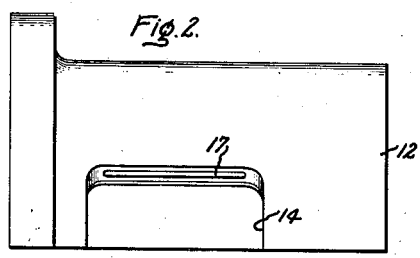
Figure 2:
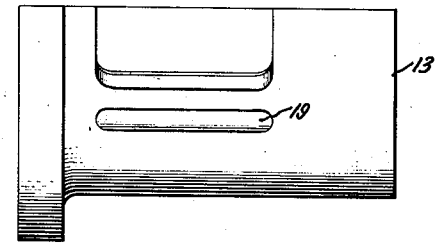

In the drawing, Fig. 1 is a sectional end elevation of my improved bearing assembly and Fig. 2 is a side view of the split bearing lining of Fig. 1 showing the relative arrangement of the lubricating window.

Referring to the drawing, a bearing assembly is shown in Fig. 1, which includes a sleeve member formed of two semi-cylindrical portions 10 and 11 adapted to support a bearing lining. The supporting sleeve may be attached in any suitable manner to the vehicle to be supported, and, in the illustrated construction the supporting sleeve portion 10 is part of the magnet frame of the motor which drives the vehicle and the portion 11 of the supporting sleeve is the axle cap. Within the supporting sleeve member, I provide a split bearing with lining portions 12 and 13 forming substantially equal halves of a tubular bearing member. These two semi-cylindrical portions 12 and 13 of the bearing lining are arranged in the split sleeve member so that the plane of division of the bearing lining is substantially at right angles to the plane of division of the supporting sleeve member. Furthermore, with this construction the split in the bearing lining is arranged at the point of minimum bearing pressure and the point of maximum bearing pressure occurs at the continuous or unsplit portion of the bearing lining adjacent the split in the supporting sleeve member. This reduces the tendency for a lubricant to leak out between the splits in the bearing lining and provides a better wearing surface at the point of maximum bearing pressure. As more particularly shown in Fig. 2, a lubricant supply opening or window 14 is formed in the bearing lining and extends on both sides of one of the splits in the bearing lining. This window is formed by cutting a rectangular opening in one of the longitudinal edges of each half of the bearing lining. Further, since the lubricating window is arranged in that part of the bearing lining which is at minimum bearing pressure the lubricating fluid may be conducted through this window into the bearing with the least amount of resistance.

In order to form a simple and efficient means for expanding the two halves 12 and 13 of the bearing lining into the supporting sleeve members 10 and 11, I provide adjacent one longitudinal edge of the window 14 a bearing lining clamp 15. This bearing lining clamp has an adjustable supporting means which includes a bolt 16 threaded into a hole in the supporting sleeve member 11. I also provide the above mentioned longitudinal edge of the window 14 with a groove 17 which forms a surface against which the lining clamp may abut when the bolt is tightened. In order to prevent the bearing lining from rotating when the clamp bolt 16 is tightened I provide a stop member 18 on the surface of the semi-cylindrical sleeve portion 11. To cooperate with this stop member the outer surface of the semi-cylindrical bearing portion 13 has a groove 19 which is adjacent the longitudinal edge of the window opposite the bearing lining clamp. Into this groove therefore projects the stop member 18. Thus, adjustment of the bolt 16 will vary the force exerted on the bearing lining at the point of contact between the clamp and the bearing lining in a direction substantially tangential to the semi-cylindrical bearing surface. I have found that this forms a very efficient and simple means for providing the desired expansion of the split bearing lining into the supporting sleeve member.

A lubricant may be conducted to the bearing through the window 14 in any suitable manner, and in the arrangement shown in Fig. 1, I provide a capillary feed by a wick member 20 of any suitable material, such as wool yarn. This yarn is held by a holder 21 which has a reversible bent portion 22 at one end thereof arranged to cooperate with a bracket member 23 to support one end of the wick member 20. In order to prevent the wick from creeping when the journal rotates the other end of the wick member is held by a bracket member 24, which is attached to the holder 21. This wool yarn assembly is held in the window by means of a waste pusher provided with an arm 25 pivoted at one end and biased towards the yarn by suitable springs 26. The arm member 25 has a tongue member 27 which in its operative position extends into the reversible bent portion 22 of the yarn holder 21. In order to replace a worn out wool yarn assembly the waste wool pusher arm 25 may be held in its retracted position by means of a bolt 28. This inoperative position of the waste pusher is shown in dotted lines in Fig. 1.

The oil may be supplied to the wick member in any suitable manner and the construction shown in Fig. 1, which I have found to be very successful, is described in Patent 2,158,879, Manning, assigned to the same assignee as the present invention. The wick member extends down into a chamber 29 which is kept filled with oil up to the level of its vent opening 30. The oil is supplied to the chamber 29 from a reservoir 31 through the passageway 32 and opening 33. The air in the reservoir 31 is kept at slightly less than atmospheric pressure. When the oil in the chamber drops below the level of the vent opening 30, air is conducted into the reservoir 31 through the pipe 34 which extends almost to the top of the reservoir. This will allow more lubricant to flow into the chamber 29 from the reservoir through the passage 32. In order to fill the reservoir and at the same time to prevent the flow of lubricant from the reservoir to the chamber 29 a filling nozzle 35 is placed into an opening 36 with its end projecting into the opening 33. The end of the filling nozzle 35 is tapered at 37 so as to make a snug fit with the opening 33. Lubricant may then be admitted through the pipe 38 into the nozzle 35 by turning the valve 39. As soon as the level of the lubricant in the reservoir rises above the vent pipe 34 it will begin to flow into the chamber 29 through the restricted opening in the vent 30. This will cause a decrease in the rate of flow of the lubricant and a corresponding increase in back pressure to be built up in the nozzle 35 which will be registered by a gage 40. This indicates to the operator that the reservoir is filled and the valve 39 is then closed and the filling nozzle removed.

In view of the foregoing it will be seen that I have provided a bearing assembly wherein the oil is conducted into the bearing at the point of minimum bearing pressure and the point of maximum bearing pressure occurs on that portion of the lining removed from its plane of division.

Modifications of the particular arrangements which I have disclosed will occur to those skilled in the art. I do not desire by my invention to be limited to the particular construction set forth and I intend in the appended claims to cover all modifications which do not depart from the spirit and scope of my invention.

What I claim as new and desire to secure by Letters Patent of the United States is:

1. A bearing including a split sleeve member and a split bearing lining supported by said sleeve member, a lubricating window in said bearing lining at one of its splits, said sleeve member and said lining being arranged so that the plane of division of said bearing lining is substantially at right angles to the plane of division of said bearing sleeve member so that the point of maximum bearing pressure will occur on that portion of said bearing lining adjacent the plane of division of said sleeve member and the point of minimum bearing pressure will occur on that portion of said bearing lining adjacent said lubricating window.

2. A bearing including a split sleeve member and a split bearing lining supported by said sleeve member, a window in said bearing lining at one of its splits through which a lubricant may enter, said bearing lining being so positioned that the point of minimum bearing pressure occurs on that portion of said bearing lining adjacent said lubricating window, said sleeve member and said lining being arranged so that the plane of division of the bearing lining is substantially at right angles to the plane of division of said bearing sleeve member.

3. A bearing including a sleeve member and a bearing lining supported by said sleeve member comprising two semi-cylindrical portions, a window in said bearing lining at one of its splits, a lubricant reservoir communicating with said window, means for conducting lubricant from said reservoir to said window, and means including an abutment cooperating with one of said portions adjacent one edge of said window, and an adjustable clamp cooperating with the other of said portions adjacent an edge of said window opposite to said last-mentioned edge for expanding said bearing lining portions into intimate contact with said supporting sleeve member.

4. A bearing including a sleeve member and a split bearing lining supported by said sleeve member, a window arranged in said bearing lining at one of its splits through which a lubricant may enter, a slot in said bearing member adjacent an edge of said window, an abutment extending from said sleeve member and so constructed and arranged as to project into said slot, a clamp member, and means for adjustably supporting said clamp member, said clamp member having a portion abutting against another edge of said window and a portion abutting against said sleeve member so as to exert a force on said bearing lining in a plane substantially tangential to the surface thereof whereby said bearing is expanded in close surface contact with said supporting sleeve member.

MAX R. HANNA.